(12) United States Patent
Gracyalny (10) Patent No.: US 9,534,733 B2
(45) Date of Patent: Jan. 3, 2017

(54) MODULAR GUARDING SYSTEM

(71) Applicant: A & E Incorporated, Racine, WI (US)

(72) Inventor: Kevin Gracyalny, Palmyra, WI (US)

(73) Assignee: A & E Incorporated, Racine, WI (US)

( * ) Notice: Subject to any disclaimer, the term of this patent is extended or adjusted under 35 U.S.C. 154(b) by 322 days.

(21) Appl. No.: 14/290,644

(22) Filed: May 29, 2014

(65) Prior Publication Data

US 2014/0352490 A1 Dec. 4, 2014

Related U.S. Application Data

(60) Provisional application No. 61/828,856, filed on May 30, 2013.

(51) Int. Cl.
*F16P 1/02* (2006.01)
*F16P 3/00* (2006.01)

(52) U.S. Cl.
CPC ............... *F16P 1/02* (2013.01); *F16P 3/001* (2013.01); *Y10T 74/2193* (2015.01)

(58) Field of Classification Search
CPC ............ Y10T 74/2193; Y10T 74/219; Y10T 74/2191; Y10T 74/2194; Y10T 74/2195; Y10T 74/2196; Y10T 74/2198; Y10T 83/8723; Y10T 83/8722; Y10T 83/872; F16P 1/02; F16P 3/001; F16P 3/02; F16P 3/125; E04G 3/22; E04G 3/28; E04G 2003/283; E04G 2003/286; E04G 5/142; E04G 5/141; E04G 5/14; E01F 13/022; E06B 11/04; E06B 2009/002; A47B 96/067; A47F 5/0838; A47F 5/0853; A47F 5/0846; B23Q 11/0891; B23Q 11/0866; B27G 19/02; B27G 19/04; B27G 19/06; B27G 21/00
USPC ................. 248/336, 333, 327, 324, 326
See application file for complete search history.

(56) References Cited

U.S. PATENT DOCUMENTS

| | | | | |
|---|---|---|---|---|
| 140,003 A | * | 6/1873 | Blaisse | F21V 21/02 248/336 |
| 1,217,550 A | * | 2/1917 | Alwine | B27G 21/00 144/251.2 |
| 1,533,302 A | * | 4/1925 | Boye | E06B 9/50 211/103 |
| 1,830,508 A | * | 11/1931 | Freeburg | F16P 1/02 74/612 |
| 2,868,569 A | * | 1/1959 | Madden | F16P 1/02 403/347 |
| 3,384,078 A | * | 5/1968 | Gauthier | A61B 17/02 600/215 |

(Continued)

*Primary Examiner* — Daniel Yabut
(74) *Attorney, Agent, or Firm* — Ryan Kromholz & Manion, S.C.

(57) ABSTRACT

Disclosed is a modular barrier system to protect a machine user from injury, the barrier structure having a plurality of modular units that can be manipulated individually to provide variable configurations of the barrier structure, that can be used with different pieces of machinery or for different applications, without removal or changing of the barrier structure in its entirety. The modular units comprise a slide unit and a latch mechanism to lock each individual modular unit in place, by way of ratcheting teeth. The barrier system may be positioned on a rail system that provides for lateral movement of the modular units while maintaining its attachment to the rail by a rail lock mechanism on the modular unit.

9 Claims, 6 Drawing Sheets

(56) References Cited

U.S. PATENT DOCUMENTS

| | | | | |
|---|---|---|---|---|
| 3,587,344 A | * | 6/1971 | Plum | F16P 1/02 |
| | | | | 74/602 |
| 3,798,998 A | * | 3/1974 | Connors | F16P 3/04 |
| | | | | 74/612 |
| 3,877,859 A | * | 4/1975 | Grazine | B29C 45/84 |
| | | | | 192/133 |
| 3,896,683 A | * | 7/1975 | Dopke | F16P 1/02 |
| | | | | 74/612 |
| 4,635,699 A | * | 1/1987 | Kauffman | B23Q 11/0825 |
| | | | | 160/211 |

* cited by examiner

MODULAR GUARDING SYSTEM

RELATED APPLICATIONS

This application claims the benefit of U.S. Provisional Patent Application Ser. No. 61/828,856, filed 30 May 2013, and titled "Modular Barrier System."

BACKGROUND OF THE INVENTION

The present invention relates generally to a safety barrier system that is positioned between the operative parts of a machine and a machine operator or bystanders in the working area. The present invention relates more particularly to a barrier system having a plurality of modular units that can each be individually and selectively positioned at various levels as necessitated by the machine being used and the operations thereof.

Industrial machinery may utilize several moving parts that have the potential to cause injury to an operator, or other persons nearby, should they get caught in or struck by any of the moving parts. As such, regulations have been instituted that require barriers and protection to minimize access to the areas of moving parts and therefore lessen the chances of injury. There are several types of barrier structures that are known and used in the industry for this purpose. Some of these structures, however, may be difficult and very time-consuming to manipulate in order to gain access to a machine area for servicing or changing the machine, or for use on different machinery or for different functions. As such, there remains a need for a barrier structure that can be easily modified for these purposes, in particular, without removing or changing the entire barrier structure.

SUMMARY OF THE INVENTION

The present invention satisfies this need by providing a modular barrier system having a plurality of barrier units that are individually movable to various levels and positions, and are slidable along a rail system to add or remove modular units without removing and/or replacing an entire structure, in order to accommodate use for different machines and for different functions.

On aspect of the invention provides a modular barrier system for attachment to a rail structure, with the modular barrier system having at least one adjustable barrier unit having at least two slide units with a first main slide with teeth along a first side of the first main slide slidably received between a first pair of slide guide panels, a second main slide with teeth along a first side of the second main slide slidably received between a second pair of slide guide panels, a latch mechanism having a first a latch mechanism aperture and a second latch mechanism aperture to receive the first and second pair of slide guide panels, respectively, and pivotably affixed to the first and second pairs of slide guide panels, whereby the teeth of the first and second main slides interface with the first and second latch mechanism apertures, and wherein the first and second pairs of slide guide panels are removably received attached to the rail structure.

The first main slide may be inter-connected to the second main slide by a slide spacer.

At least two adjustable barrier units may be inter-connected by at least one of an upper spacer or a lower spacer.

A latch mechanism lock may be connected to at least one of the first and second pairs of slide guide panels and removably engagable with the latch mechanism.

A rail lock may be connected to at least one of the first and second pairs of slide guide panels and removably engageable with the rail structure.

A static barrier having a solid member and a pair of receiving guides each with a length and a receiving guide aperture extending substantially the length of the receiving guide, wherein the solid member is received within the receiving guide apertures, and whereby the receiving guides are removably attachable to the rail structure may also be provided in the modular barrier system.

The static barrier unit may further have a pair of containment members extending alongside the receiving guides, whereby the pair of receiving guides and the solid member are positioned between the pair of containment members, and whereby the pair of containment members are removably attachable to the rail structure.

The pair of receiving guides and the pair of containment members may be inter-connected by at least one of an upper containment member or a lower connecting member.

The solid member may be comprised of a substantially transparent material.

Another aspect of the invention provides a modular barrier system having at least one adjustable barrier unit with at least two slide units, each slide unit having a plurality of slide guide panels each with a guide panel top end portion, a guide panel bottom end portion opposite the guide panel top end portion, a guide panel first surface extending between the guide panel top end portion and the guide panel bottom end portion, and a guide panel rear surface opposite the guide panel first surface, a latch hook located on the guide panel rear surface, a notch extending inwards from the guide panel rear surface at or near the guide panel top end portion, and a flange protruding outward from the guide panel top end portion; a plurality of main slides each having a slide top end portion, a slide bottom end portion, and a slide front edge, wherein each main slide has a vertical slide aperture extending from substantially the slide top end portion to the slide bottom end portion and slide teeth along the slide front edge; a substantially U-shaped latch mechanism having a first latch mechanism aperture within one stem of the "U" of the U-shaped latch mechanism and a second latch mechanism aperture within the other stem; whereby a first main slide is positioned between a first pair of slide guide panels to form a first slide unit; whereby a second main slide is positioned between a second pair of slide guide panels to form a first slide unit; whereby the first slide unit is positioned through the first latch mechanism aperture, with one end of the first latch mechanism aperture received within the first slide unit latch hook and the other end of the first latch mechanism aperture selectively engageable with the first slide unit slide teeth, and the second slide unit positioned through the second latch mechanism aperture, with one end of the second latch mechanism aperture received within the second slide unit latch hook and the other end of the second latch mechanism aperture selectively engageable with the second slide unit slide teeth; and a rail structure comprising an open channel having a substantially flattened U-shaped cross-section wherein the exposed edges along the channel are hooked inward forming an upper form and a lower form; and wherein the at least one barrier unit is removably engageable with the rail structure, whereby the lower form of the rail is received within the notches of the slide guide panels and the flanges of the slide guide panels engage the upper form of the rail.

The first main slide may be joined to the second main slide by a slide spacer.

At least two adjustable barrier units may be joined together by at least one of an upper spacer or a lower spacer.

A latch mechanism lock may be connected to at least one of the first and second pairs of slide guide panels and removably engagable with the latch mechanism.

A rail lock may be connected to at least one of the first and second pairs of slide guide panels and removably engageable with the rail structure.

A static barrier unit comprising a solid member and a pair of receiving guides each with a length and a receiving guide aperture extending substantially the length of the receiving guide, wherein the solid member is received within the receiving guide apertures, and whereby the receiving guides are removably attachable to the rail structure may also be provided in the modular barrier system.

The static barrier unit may also have a pair of containment members extending alongside the receiving guides, whereby the pair of receiving guides and the solid member are positioned between the pair of containment members, and whereby the pair of containment members are removably attachable to the rail structure.

The pair of receiving guides and the pair of containment members may be inter-connected by at least one of an upper containment member or a lower connecting member.

The solid member may be comprised of a substantially transparent material.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
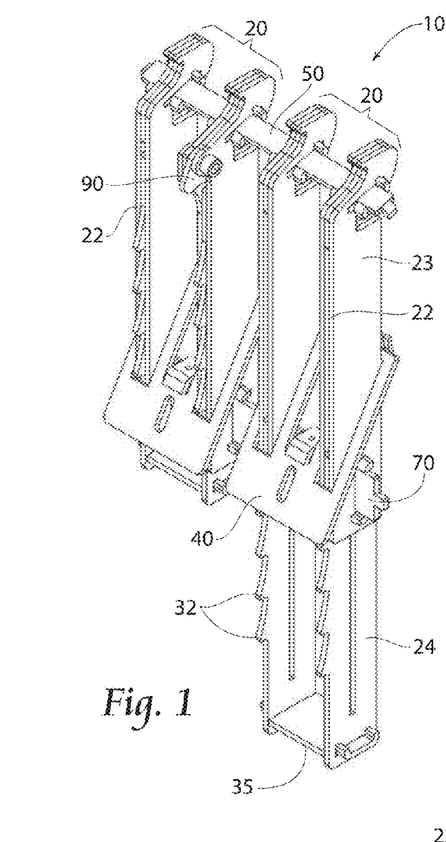
FIG. 1 is a perspective view of a first embodiment of a modular barrier system according to the present invention.
Figure 8:
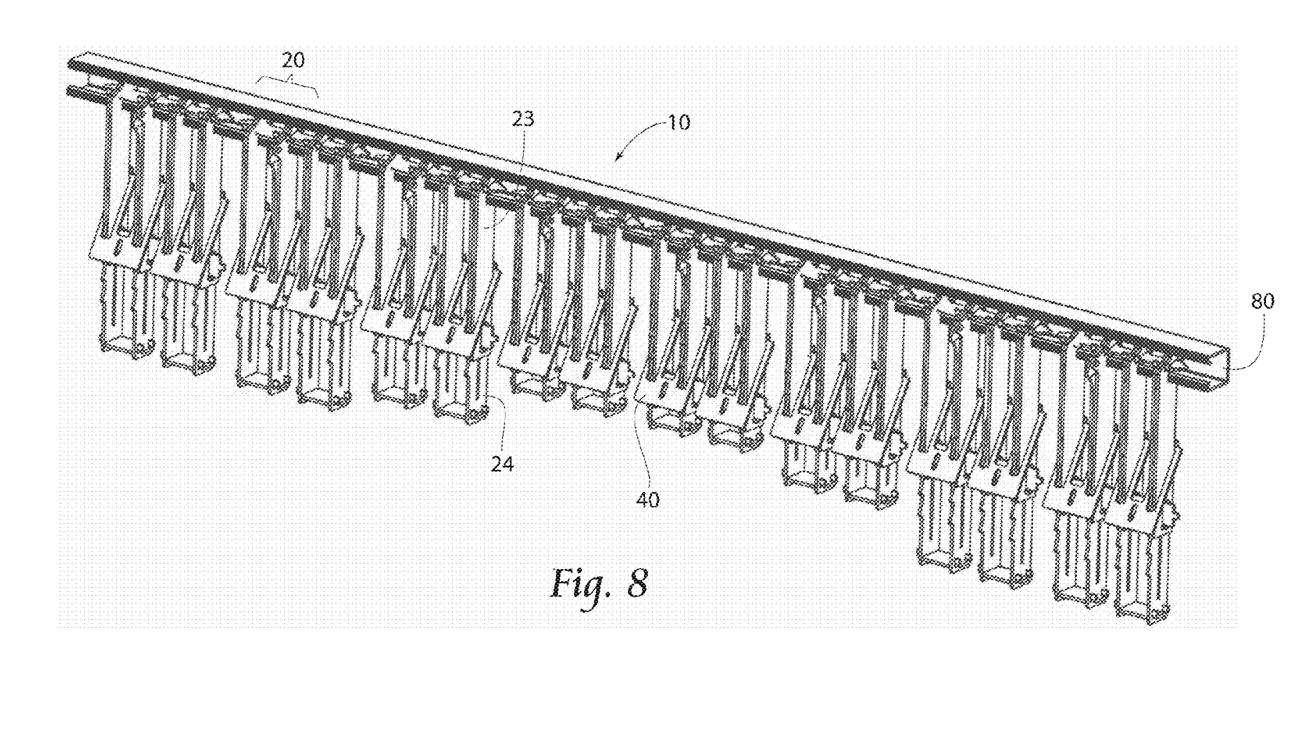
FIG. 8 is a perspective view of a plurality of modular barrier systems according to the present invention used together to form a barrier.

FIG. 1 shows a modular barrier system 10 comprising a plurality of adjustable barrier units 20. In the Figures, showing a preferred embodiment, the modular barrier system 10 is shown having two adjustable barrier units 20. A plurality of these modular barrier systems 10 (each comprising a pair of adjustable barrier units 20) may be used adjacent to one another to form a wider barrier structure (as shown in FIG. 8). Modular barrier systems 10 may be added or removed in order to span the width of the area over which the barrier is being used.

Each adjustable barrier unit 20 may be coupled to an adjacent adjustable barrier unit 20 by an upper spacer 50 and a lower spacer 70. Each adjustable barrier unit 20 may have a pair of slide units 22 and a latch mechanism 40, as detailed in FIG. 4A. The features of the slide unit 22 are detailed in FIG. 4B. Each slide unit 22 may comprise a pair of slide guide panels 23 having a main slide 24 sandwiched therebetween. Each slide guide panel 23 may have (a) a rail system mechanism 25 at a top end portion 23a, (b) a latch hook 26, shown in its assembly position, at a substantially central location between the top end portion 23a and a bottom end portion 23b on a rear surface 23c, and (c) a vertical spacer aperture 27 extending between a first surface 23d and a second surface 23e of the slide guide panel 23 near the bottom end portion 23b. The main slide 24 may be positioned between the pair of slide guide panels 23, and may have a vertical slide aperture 31 extending substantially along the length of the main slide 24 from near a top end portion 24a to near a bottom end portion 24b. The slide aperture 31 is substantially aligned with the spacer apertures 27 of the slide guide panels 23 when sandwiched together. Each main slide 24 may have a plurality of slide teeth 32 aligned along at least a portion of a front edge 24c of the main slide 24. The slide teeth 32 are preferably equidistant from one another.

Each slide unit 22 is held together via the lower spacer 70, which also connects a first slide unit 22 to its partner slide unit 22 (comprising a first adjustable barrier unit 20), as well as connecting a first adjustable barrier unit 20 to an adjacent adjustable barrier unit 20 (comprising a modular barrier system 10). As such, the lower spacer 70 may be of an appropriate width to accommodate the pair of adjustable barrier units 20 being used in the modular barrier system 10, as shown in the preferred embodiments. The lower spacer 70 passes through the spacer aperture 27 of the slide guide panel 23 and the slide aperture 31 of the main slide 24.

The pair of slide units 22 are also held together and spaced apart at a slide distance S by way of a slide spacer 35. Slide spacer 35 passes through each main slide 24 of the adjustable barrier unit 20 through a horizontal base aperture 34.

The pair of main slides 24 in the adjustable barrier unit 20, slide uniformly between the slide guide panels 23 to lengthen or shorten the adjustable barrier unit 20. In this way, adjustable barrier units 20 may be shortened or lengthened to manipulate the height of the modular barrier system 10 and/or accommodate different shaped openings for access to the machine being used. Furthermore, the slide guide panels 23 and/or main slide 24 may be manufactured at any desired length to accommodate different heights of the opening or access area on which the barrier structure is being used. The figures depict one adjustable barrier unit 20 being positioned at a different height than that of an adjacent adjustable barrier unit 20, which is obtained by manipulating the pair of main slides 24 up or down between the slide guide panels 23. Thus, as shown, the barrier system 10 provides vertical variability across the infeed area. The ability of the barrier to accommodate varying overall height opening is addressed on page 5, line 5. There is a distinction between the overall length of a barrier and the slide adjustment feature of a barrier. In particular, the barrier of the present invention can have a variable width by providing sliding adjustment, and can also have openings of variable width based on different configurations of the individual components.

Figure 2:
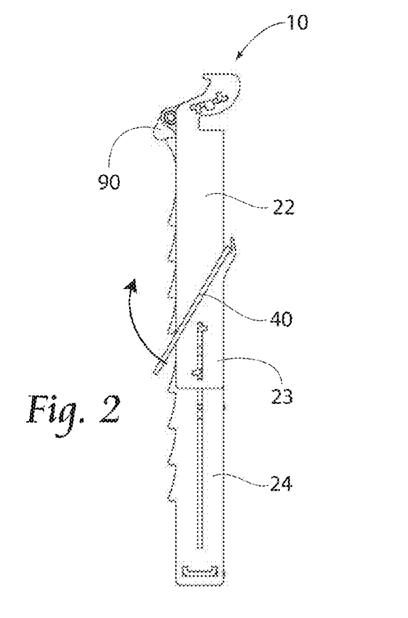
FIG. 2 is a side view of the embodiment of a modular barrier system shown in FIG. 1.
Figure 3:
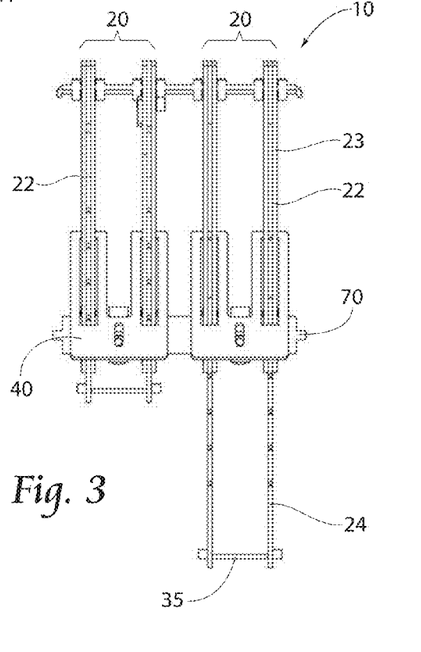
FIG. 3 is a front view of the embodiment of a modular barrier system shown in FIG. 1.
Figure 4A:
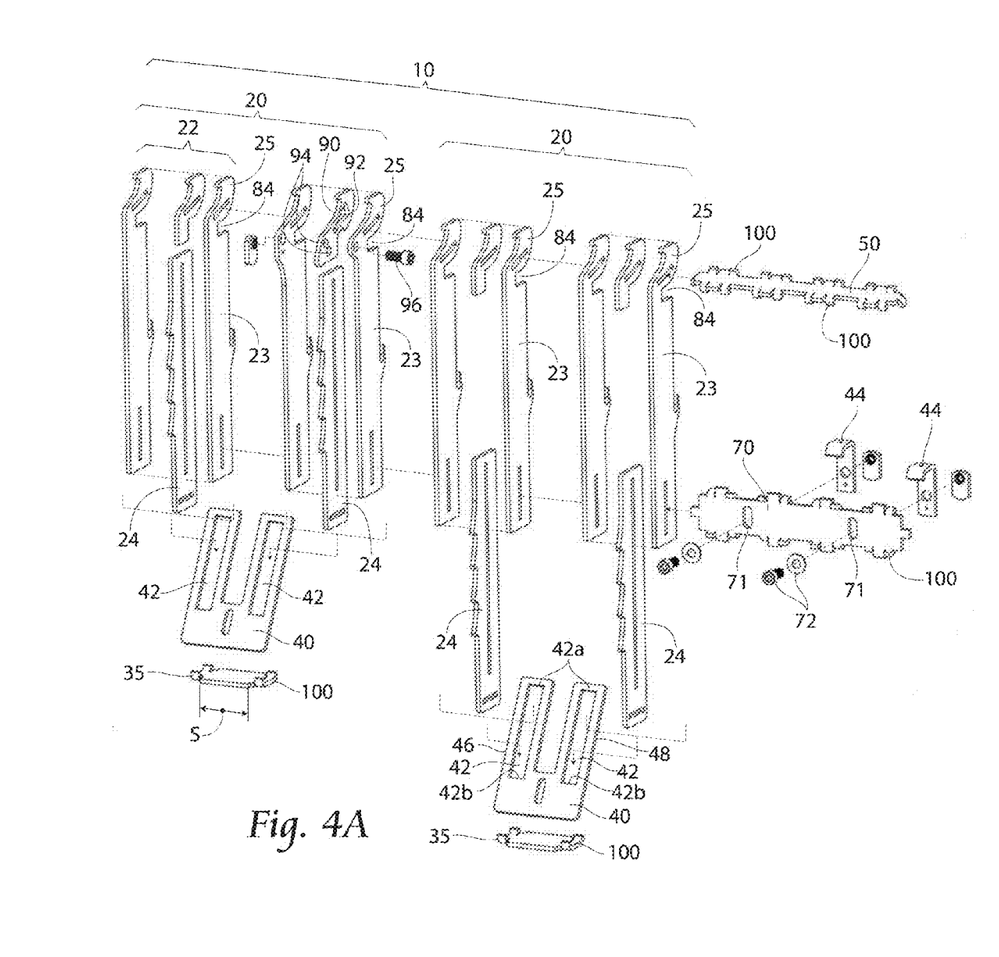
FIG. 4A is an exploded view of the embodiment of a modular barrier system shown in FIG. 1.
Figure 4B:
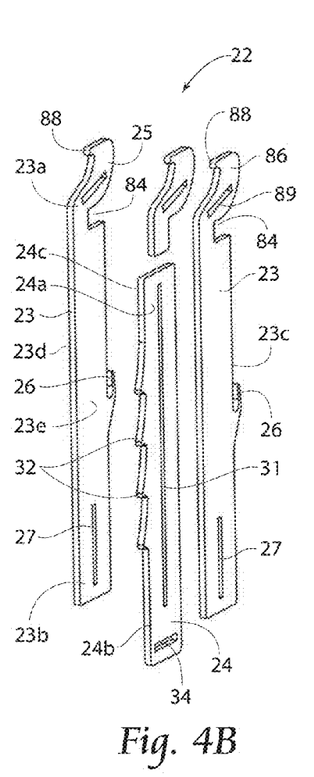
FIG. 4B is an exploded view of a slide unit according to the present invention.

The main slides 24 are held into vertical position, thereby locking the adjustable barrier unit 20 at the desired height by way of latch 40. Latch 40 may be substantially u-shaped with a first stem 46 and a second stem 48, each with latch mechanism apertures 42 having a first end 42a and a second end 42b. The latch mechanism apertures 42 are configured to pass around the slide unit 22 and hook onto the latch book 26 (shown in its assembly position) on the slide guide panel 23. This is shown particularly in FIGS. 1 and 2. The latch mechanism apertures are further sized and configured to latch unto corresponding slide teeth 32 on partnered main slides 24. In this way, downward movement of the main slide 24 is prohibited by the latch 40, and further restricted by and around the configured shape of teeth 32. Additionally, once in place, upwards movement of the main slide 24 may be prohibited by way of a lock hook 44 engaging the latch 40. Lock hook 44 is preferably coupled to the lower spacer 70 at a hook aperture 71 by securing means 72, such as by a socket head cap screw and washer, as shown in FIG. 4A. Hook aperture 71 may be sized and configured to accommodate at least a first released position and a second locked position in which the lock hook 44 is positioned on the lower spacer 70, to either engage the latch 40 or allow the latch 40 to rotate about a latch hook axis, thereby allowing release of the main slide 24. Accordingly, latch book 26 (shown in its assembly position) is preferably sized and configured to be such a shape and diameter to accommodate rotational movement of the corresponding portion of latch 40 within latch hook 26.

When the latch 40 is in the locked position, engaging the desired slide teeth 32 and the lock hook 44 is secured by means 72 in a second locked position, engaging the latch 40, upward movement of the main slide 24 is prohibited. This is accomplished by the ratcheting nature of the slide teeth 32. Because latch 40 is locked by lock hook 44, the latch 40 is prohibited from movement away from main slide 24 to such a distance that would allow slide teeth 32 to pass and slide the main slide 24 upwards.

Main slide 24 may be released, and therefore moved to accommodate different configurations of the modular barrier system 10 by releasing the securing means 72 that hold the latch hook 44 in the locked position and re-securing the latch hook 44 in a first, (up) position, and then rotating the latch 40 to disengage with the teeth, therefore allowing upward and downward movement of the pair of main slides 24 and the adjustable barrier unit 20 as a whole.

Figures 5, 6A, 6B, 6C:
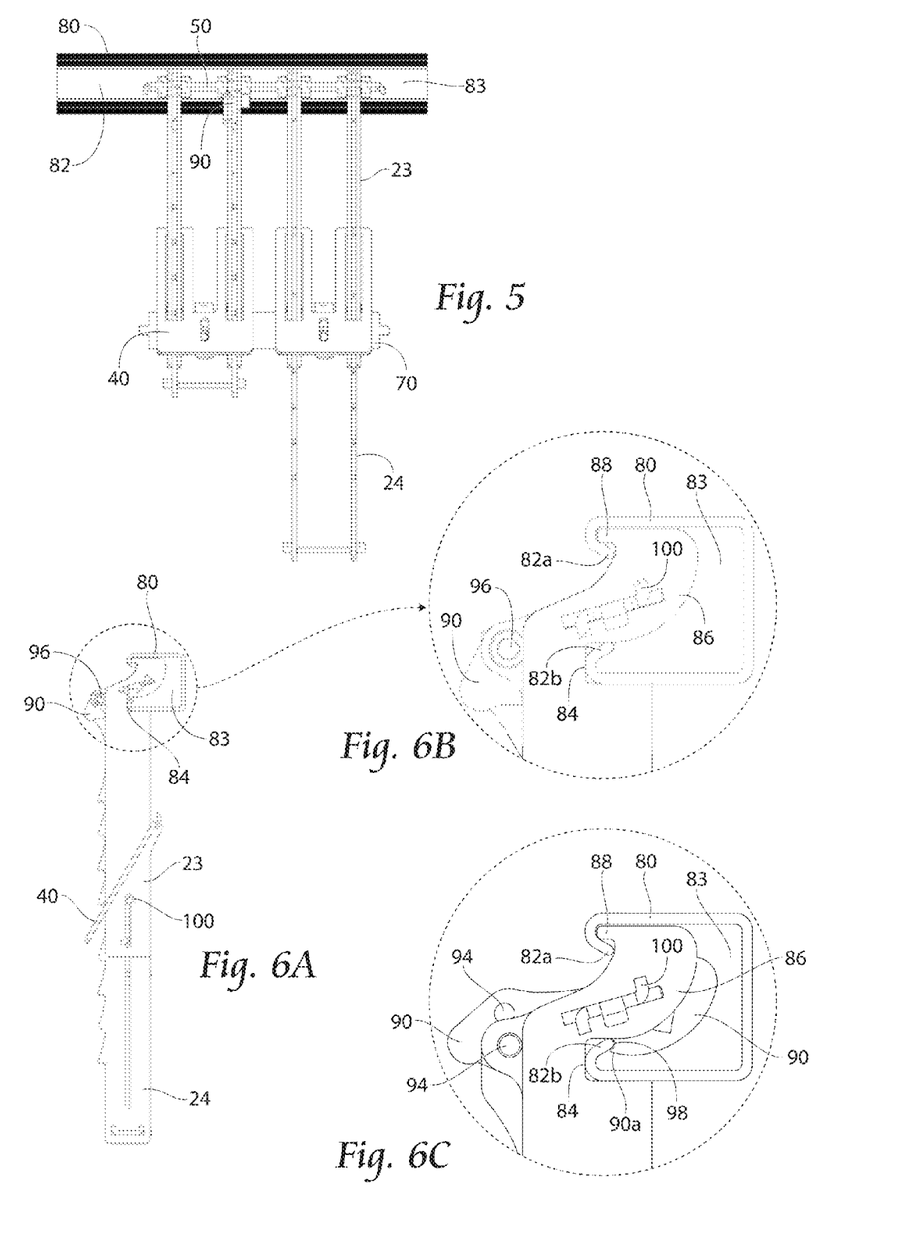
FIG. 5 is a front view of the embodiment of a modular barrier system shown in FIG. 1 and a rail system.
FIG. 6A is a side view of the rail system connection apparatus of the modular barrier system shown in FIG. 1.
FIG. 6B is a detailed view of the rail system connection apparatus shown in FIG. 6A, shown in an unlocked position.
FIG. 6C is a detailed view of the rail system connection apparatus shown in FIG. 6A, shown in a locked position.

As shown in FIGS. 5-6C, the modular barrier system 10 may be positioned on a rail structure 80. The rail structure 80 may be an existing structure, such as the B32 Channel that is manufactured by COOPER B-Line. The rail structure 80 is preferably a longitudinal rail, or open channel, of a flattened U-shaped cross-section wherein the exposed edges along the longitudinal direction are hooked inward forming upper form 82a and lower form 82b that may engage the rail system mechanism 25.

The rail system mechanism 25 is preferably positioned at the top end portion 23a of the slide guide panel 23. As discussed above, two slide guide panels 23 are positioned together to form a portion of the slide unit 22. FIG. 6B shows in detail the features of the rail system mechanism 25. As shown, the slide guide panel 23 has a notch 84 to receive lower form 82b, at or near the top end portion 23a. The rail system mechanism 25 may further comprise a waved portion 86 that curves slightly upwards towards a rail system flange 88. The waved portion 86 may have an upper spacer aperture 89 formed therein for receiving upper spacer 50 to connect adjacent slide units 22 and adjacent adjustable barrier units 20. The rail system flange 88 is configured to receive upper form 82a.

The modular barrier system 10, particularly the slide guide panels 23 may be secured to the rail structure 80 by way of a rail lock 90. Rail lock 90 may be moveably coupled to at least one slide unit 22 of a modular barrier system 10, sandwiched between the rail system mechanism 25 of two slide guide panels 23. Preferably, there is one rail lock 90 for each modular barrier system 10, as shown in the Figures. As shown, the rail lock 90 has a slide aperture 92 that is configured to allow a slight rotation of the lock 90 about the upper spacer 50. The rail lock 90 may also have at least two screw apertures 94 to receive a socket head cap screw to lock the rail lock 90 in an open position (as shown in FIG. 6B) or in a locked position (as shown in FIG. 6C). The rail lock 90 may be secured in either the open/unlocked or the locked position by way of securing means, such as a socket head cap screw 96. The rail lock 90 may further comprise a locking hook 98 located on a rear edge 90a of the rail lock 90 that is configured to engage the lower form 82b on the rail structure 80, as described below.

The rail lock is positioned in the open position in order for the barrier system 10 to be rotationally lowered into the rail structure 80. Once the notch 84 is positioned about the lower form 82b and the rail system flange 88 is engaged with the upper form 82a, the rail lock 90 may be rotated into the locked position (shown in FIG. 6C) such that the locking hook 98 engages with the lower form 82b and prevents any rotational movement of the rail system mechanism 25, and thus the adjustable barrier units 20, out from the rail structure opening 82. In this way, the modular barrier system 10 is secured in front of or near the piece of machinery on which it is used, providing protection for the user.

Each of the spacer devices, such as upper spacer 50, lower spacer 70, or slide spacer 35 is secured within the respective apertures (to hold the respective pieces of the modular barrier system 10, adjustable barrier unit 20, or slide unit 22, etc. together) by way of holding flanges 100. The holding flanges 100 preferably extend from the respective spacer device at a length that is equal to or less than the length of the aperture through which it passes. As shown in the Figures, the holding flanges 100 are configured in sets of 3 flanges: one that is positioned within the respective aperture, and two outer flanges. Alternatively, as shown with respect to the slide spacer 35, the spacer device may have only one holding flange 100 that is configured to be positioned to the outside of the base aperture 34. The holding flanges 100 are positioned along the respective spacer device at any distance, determined by the spacing that is desired, by way of example, between adjacent slide units 22 or adjacent main slides 24, etc. Once the spacer device, such as upper spacer 50, lower spacer 70, or slide spacer 35 is positioned with the respective aperture (such as upper spacer aperture 89, spacer aperture 27, or base aperture 34), the outer flanges may be wedged or otherwise bent, preferably in opposing directions, to secure the spacer device in place and minimize any lateral movement of the spacer device and retain the other pieces of the modular barrier system 10 in place.

Figure 7:
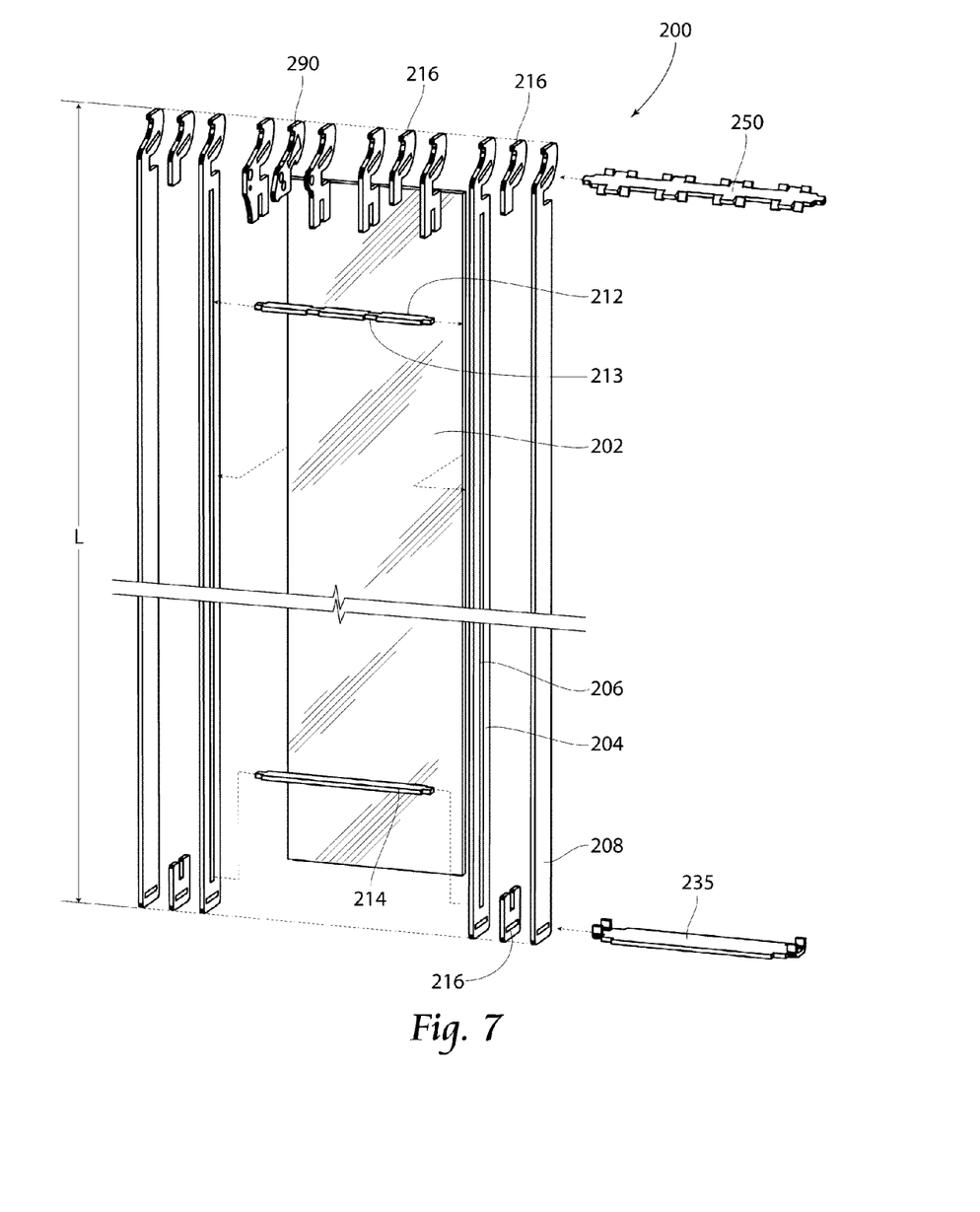
FIG. 7 is an exploded view of a second embodiment of a modular barrier system according to the present invention.

FIG. 7 illustrates a second embodiment 200 according to the present invention of a static modular barrier unit. The static barrier unit 200 preferably comprises a solid member 210, a pair of receiving guides 204, and a pair of containment members 208. As some of the elements of the static modular barrier unit 200 are consistent with elements of the adjustable modular barrier unit 20, similar numbers will designate similar elements.

The solid member 210 may comprise a transparent material such as an acrylic sheet like a PLEXIGLAS® acrylic sheet or may be made from a non-transparent material, including but not limited to, various types of plastics and/or metals.

Each receiving guide 204 has a length L and a receiving guide aperture 206 extending substantially along the length L. The length L may be of any length required depending on the specific application. The receiving guide aperture 206 is preferably sized and configured to receive the solid member 202. The receiving guides 204 preferably attach to the rail structure 80 (FIG. 9) in a similar manner as the top end portions 23a, 24a of the slide guide panels and the main slides 23, 24, respectively, described above.

The containment members 208 are substantially the same length L as the receiving guides 208 and are positioned to contain the solid member 202 and the receiving guides 204 to reduce the likelihood of the solid member 202 from exiting the receiving guide apertures 206. The containment members 208 preferably attach to the rail structure 80 (FIG. 9) in a similar manner as the top end portions 23a, 24a of the slide guide panels and the main slides 23, 24, respectively, described above.

A first gap member 212 and a second gap member 214 extend between the pair of receiving guides 204. The first gap member 212 preferably has recesses 213.

Securing members 218 may be provided to increase stability of the solid member 202 within the static barrier unit 200. The securing members 218 preferably attach to the rail structure 80 (FIG. 9) in a similar manner as the top end portions 23a, 24a of the slide guide panels and the main slides 23, 24, respectively, described above. The securing members 218 extend around and beyond the recesses 213 of the first gap member 212 to the solid member 202.

A plurality of shims 216 may also be included to provide spacing between the receiving guides 204 and the containment members 208, and between adjacent securing members 218. A rail lock 290 may also be provided, similar to the rail lock 90 described with respect to the adjustable barrier unit 20.

An upper spacer 250 and a static barrier spacer 235 may also be provided. The upper spacer 250 and the static barrier spacer 235 provide a secured inter-connection between the elements of the static barrier unit 200 similar to the upper spacer 50 and the slide spacer 35 of the adjustable barrier unit 20 described above.

FIG. 8 illustrates a plurality of adjustable barrier systems 10 installed on a rail structure 80. Some of the adjustable barrier units 20 are shown oriented at different levels.

Figure 9:
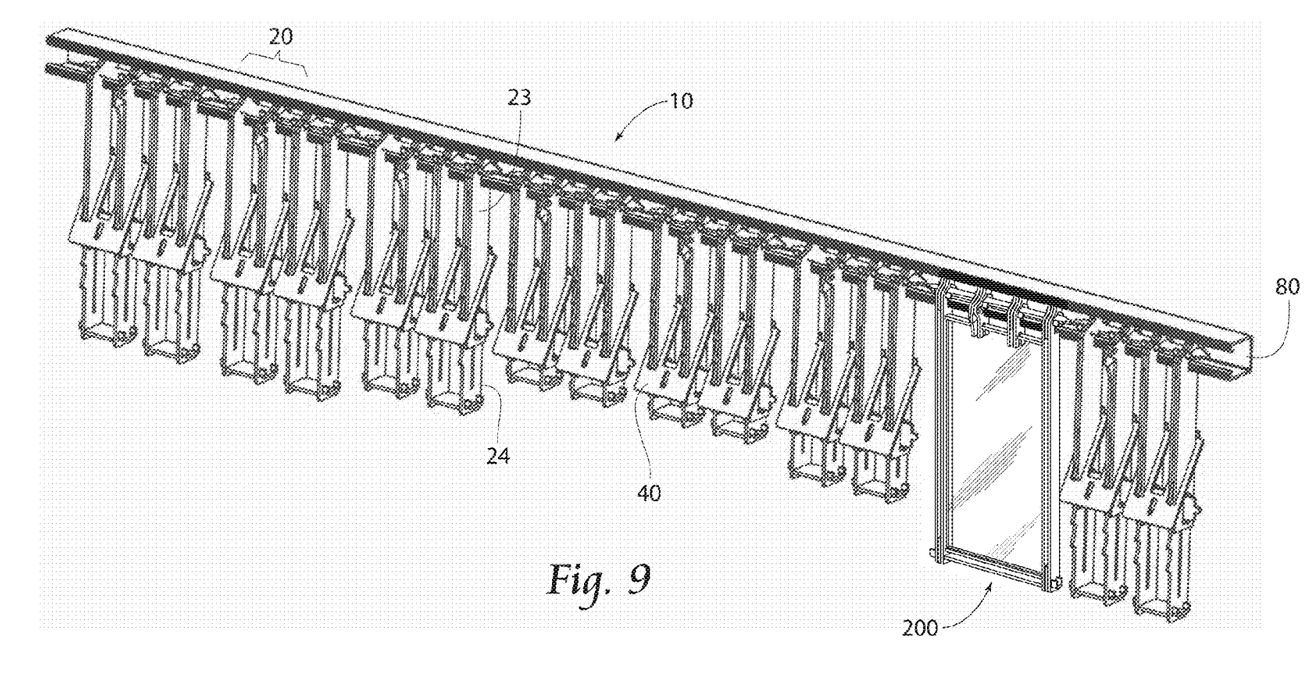
FIG. 9 is a perspective view of a plurality of modular barrier systems according to the present invention used together to form a barrier.

Similar to FIG. 8, FIG. 9 illustrates a plurality of adjustable barrier systems 10 with the addition of a static barrier unit 200. FIGS. 8 and 9 further demonstrate the adaptability of the modular barrier system 10 according to the present invention. Various combinations of adjustable barrier units 20 may be used on rail structures 80 of various lengths and may also include static barrier units 200 (transparent or non-transparent) in areas in which access is to be discouraged.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A modular barrier system comprising:
   at least one adjustable barrier unit having at least two slide units, each slide unit comprising:
   a plurality of slide guide panels each having a guide panel top end portion, a guide panel bottom end portion opposite the guide panel top end portion, a guide panel first surface extending between the guide panel top end portion and the guide panel bottom end portion, and a guide panel rear surface opposite the guide panel first surface, a latch hook located on the guide panel rear surface, a notch extending inwards from the guide panel rear surface at the guide panel top end portion, and a flange protruding outward from the guide panel top end portion;
   a plurality of main slides each having a slide top end portion, a slide bottom end portion, and a slide front edge, wherein each main slide has a vertical slide aperture extending from substantially the slide top end portion to the slide bottom end portion and slide teeth along the slide front edge;
   a substantially U-shaped latch mechanism having a first stem and a second stem;
   the first stem having a first latch mechanism aperture with a first end and a second end;
   the second stem having a second latch mechanism aperture with a first end;
   whereby a first main slide of the plurality of main slides is positioned between a first pair of slide guide panels of the plurality of slide guide panels to form a first slide unit;
   whereby a second main slide of the plurality of main slides is positioned between a first pair of slide guide panels of the plurality of slide guide panels to form a second slide unit;
   whereby the first slide unit is positioned through the first latch mechanism aperture, with the first end of the first latch mechanism aperture received within the first slide unit latch hook and the second end of the first latch mechanism aperture selectively engageable with the first slide unit slide teeth, and the second slide unit positioned through the second latch mechanism aperture, with the first end of the second latch mechanism aperture received within the second slide unit latch hook and the second end of the second latch mechanism aperture selectively engageable with the second slide unit slide teeth; and
   a rail structure comprising an open channel having a substantially flattened U-shaped cross-section having an upper form and a lower form;
   wherein the at least one barrier unit is removably engageable with the rail structure, whereby the lower form of the rail is received within the notches of the slide guide panels and the flanges of the slide guide panels engage the upper form of the rail.

2. The modular barrier system of claim 1, whereby the first main slide is joined to the second main slide by a slide spacer.

3. The modular barrier system of claim 1, wherein the at least one adjustable barrier unit includes two adjustable barrier units, the two adjustable barrier units being joined together by at least one of an upper spacer or a lower spacer.

4. The modular barrier system of claim 1, further comprising a latch mechanism lock connected to at least one of the first and second pairs of slide guide panels and removably engageable with the latch mechanism.

5. The modular barrier system of claim 1, further comprising a rail lock connected to at least one of the first and second pairs of slide guide panels and removably engageable with the rail structure.

6. The modular barrier system of claim 1, further comprising a static barrier unit comprising a solid member and a pair of receiving guides each with a length and a receiving guide aperture extending substantially the length of the receiving guide, wherein the solid member is received within the receiving guide apertures, and whereby the receiving guides are removably attachable to the rail structure.

7. The modular barrier system of claim 6, wherein the static barrier unit further comprises a pair of containment members extending alongside the receiving guides, whereby the pair of receiving guides and the solid member are positioned between the pair of containment members, and whereby the pair of containment members are removably attachable to the rail structure.

8. The modular barrier system of claim 6, wherein the pair of receiving guides and the pair of containment members are inter-connected by at least one of an upper containment member or a lower connecting member.

9. The modular barrier system of claim 6, wherein the solid member is comprised of a substantially transparent material.

\* \* \* \* \*